Oct. 4, 1932.　　　　O. CZEIJA ET AL　　　1,880,240
SOUND RECORD BAND WITH A PLURALITY OF RECORDS
Filed Nov. 21, 1930
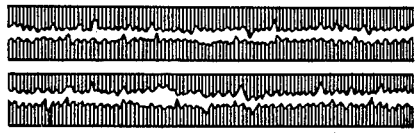
Inventor
Oskar Czeija
Hans Thirring
per [signature]
Attorney Patented Oct. 4, 1932

1,880,240

UNITED STATES PATENT OFFICE

OSKAR CZEIJA AND HANS THIRRING, OF VIENNA, AUSTRIA, ASSIGNORS TO SELENO-PHON LICHT UND TONBILD-GESELLSCHAFT M. B. H., OF VIENNA, AUSTRIA, A COMPANY OF AUSTRIA

SOUND RECORD BAND WITH A PLURALITY OF RECORDS

Application filed November 21, 1930, Serial No. 497,279, and in Austria November 30, 1929.

Sound films are known in which a plurality of different sound records is arranged on one film band any two adjacent ones running in opposite directions. This arrangement offers the advantage that the film band needs not be rewound between the reproduction of two adjacent records, but as the film has run in one given direction one record is reproduced and the next one is then reproduced as the film band runs in the opposite direction and so on.

Now the present invention relates to an improvement of this arrangement known per se for use with such films which carry sound records prepared by the zigzag outline method. Hence what is in question are those photograph records which consist of a uniformly light and a uniformly dark zone which zones are separated from each other by a zigzag line representing the sound curve. The reproduction of such sound records may take place either diascopically or episcopically in such a manner that the film is projected on an enlarged scale onto a thin cell sensitive to light or that the image of a source of light in the shape of a thin line is projected on the film while the cell sensitive to light is located immediately in rear or in front respectively of the record carrier. In both cases the half of the cell sensitive to light opposite to the light zone of the sound record will receive in the average more light than the half opposite the dark zone. This fact has for its result more particularly when selenium cells are used, that the one half mainly exposed to light of the surface sensitive to light is more fatigued than the other, so that the sound intensity of the reproduction decreases in the course of time. Moreover sound distortions may be caused by the upper and lower half of the sound curve becoming effective on parts of the cell which differ in sensitivity.

This drawback is obviated according to the invention by making the apex or projecting parts of adjacent records opposite in direction. Thus adjacent sound records do not only run in opposite directions, as is known, but they are turned as to their direction of length through an angle of 180°.

The drawing shows by way of example a constructional form in which four sound records are arranged on one film band. In the first and third record from bottom the projecting or apex parts of the dark zone are directed upwardly, in the second and fourth record they are directed downwards. If now one record is reproduced after the other then alternately the one and then the other half of the surface sensitive to light is exposed to a more intense illumination so that in case of a prolonged operation of the reproducing apparatus both halves of the cell are subject to fatigue and wear.

In connection with the fatigue of light sensitive surfaces, this is of course, a well known phenomenon, as is taught by Friedel in "Elektrisches Fernsehen, Fernkinematographie und Bildfernübertragung" (Berlin 1925, edited by Mensser). The subject is particularly discussed on pages 67, 70 and 71, the most illuminating statements occurring in the last sentence on page 70 and continuing to page 71.

What we claim is:

A sound film band comprising a plurality of different records running in parallel lines along the said film band, each of the said records comprising a light zone and a dark zone, the said dark zone having a straight base line parallel to the longitudinal axis of the said film band and a zigzag outline running along the said film band and representing the sound curve, adjacent records running in opposite directions and adapted to be played in succession, the alternate records having their said zigzag outlines directed to the same edge of the said film band, the said zigzag outlines of the remaining records being directed to the opposite edge of the said film band.

In testimony whereof we affix our signatures.

OSKAR CZEIJA.
HANS THIRRING.